United States Patent [19]

Matlock et al.

[11] 4,203,426
[45] May 20, 1980

[54] SOLAR ENERGY CONVERTER CAROUSEL MOUNTED RACK

[76] Inventors: William C. Matlock; Patricia Matlock, both of 510 S. 52nd St., #101, Tempe, Ariz. 85281

[21] Appl. No.: 933,097

[22] Filed: Aug. 11, 1978

[51] Int. Cl.² ................................................ F24J 3/02
[52] U.S. Cl. ..................................... 126/425; 126/438
[58] Field of Search .............. 126/270, 271, 425, 438, 126/439; 237/1 A; 350/283, 282, 288, 299

[56] References Cited

U.S. PATENT DOCUMENTS

| | | | |
|---|---|---|---|
| 3,924,604 | 12/1975 | Anderson | 126/270 |
| 4,000,734 | 1/1977 | Matlock et al. | 126/271 |
| 4,030,890 | 6/1977 | Diggs | 126/271 |
| 4,109,638 | 8/1978 | Matlock et al. | 126/271 |
| 4,148,301 | 4/1979 | Cluff | 126/271 |

Primary Examiner—James C. Yeung
Attorney, Agent, or Firm—Warren F. B. Lindsley

[57] ABSTRACT

A solar energy collector and converter, carousel mounted rack comprising a plurality of elongated reflectors mounted for arcuate movement on a platform and mounted for further arcuate movement each around a heating tube arranged in the linear focus of the reflectors, the carousel and reflectors each being linked to tracking mechanisms which cause the reflectors to be trained toward the location of the sun so that they receive a maximum amount of solar energy.

5 Claims, 10 Drawing Figures

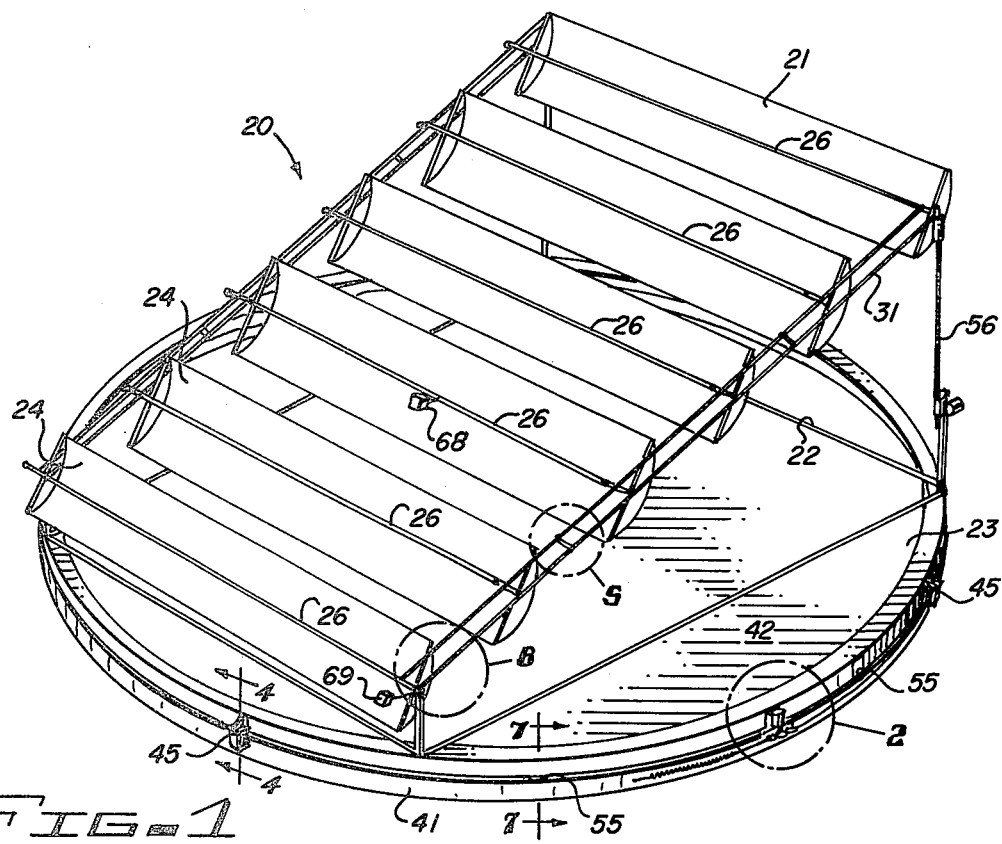
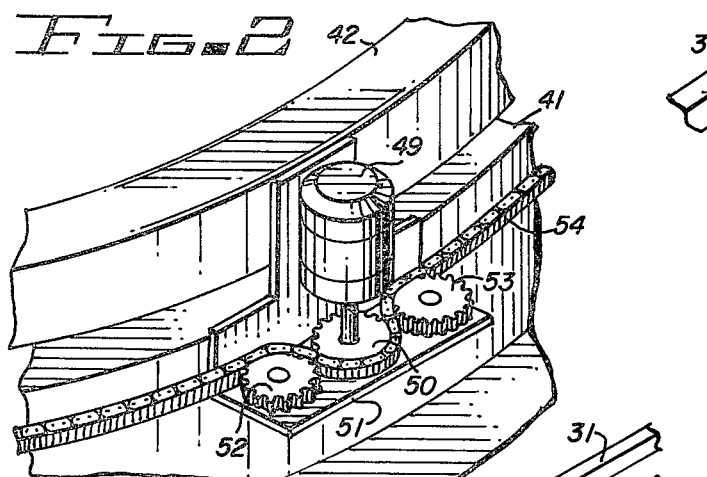
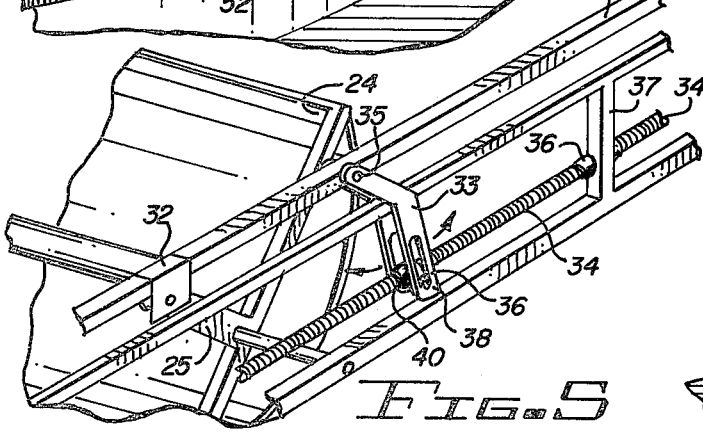
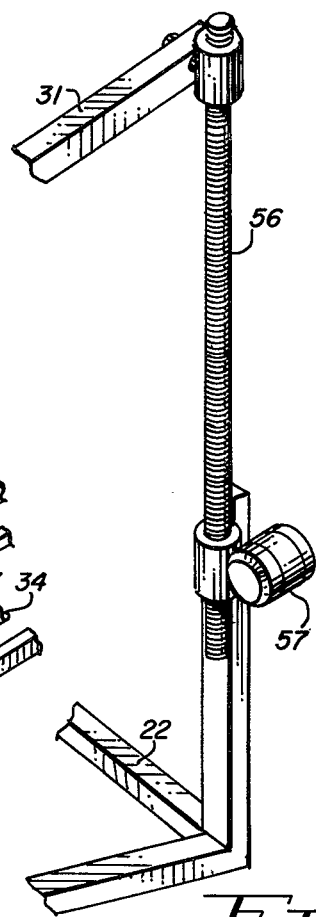

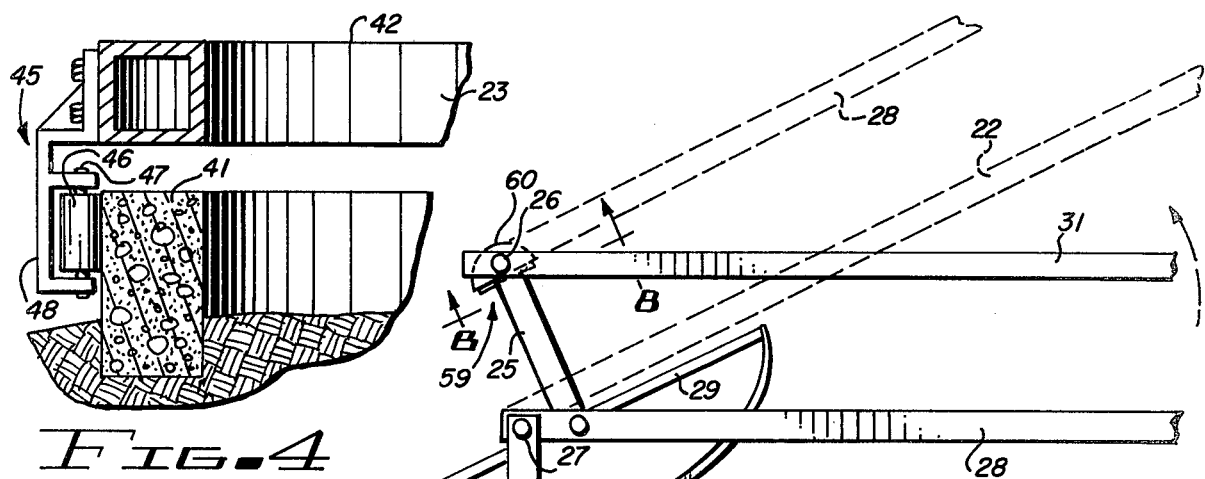
FIG.4
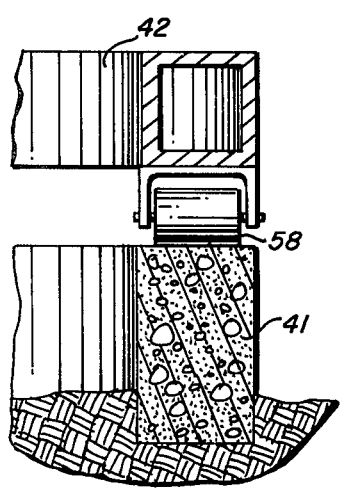
FIG.7
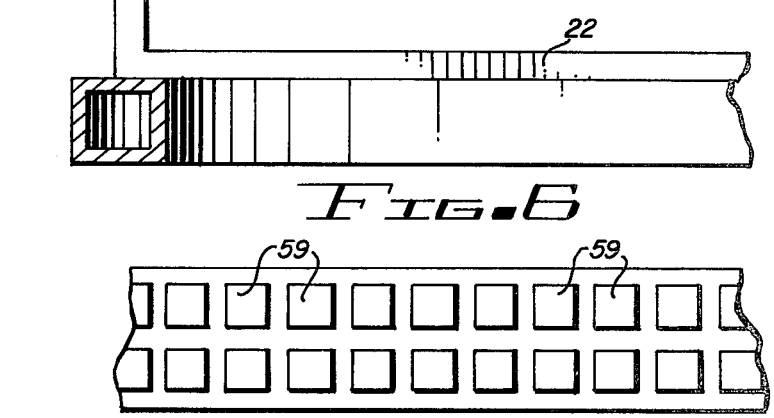
FIG.6
FIG.8
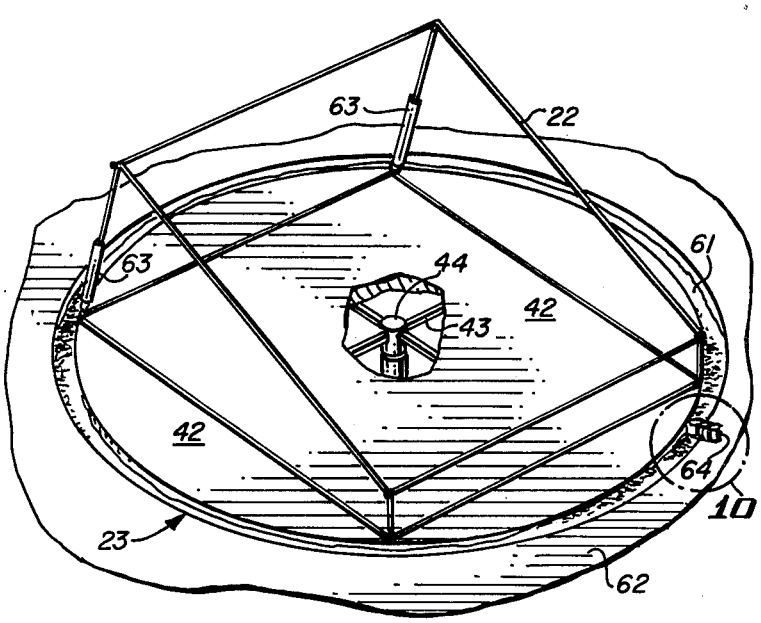
FIG.9
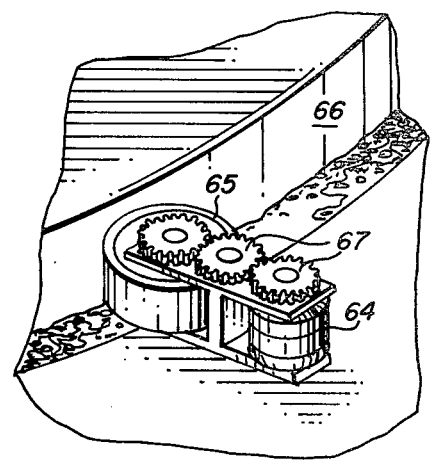
FIG.10

SOLAR ENERGY CONVERTER CAROUSEL MOUNTED RACK

BACKGROUND OF THE INVENTION

The rapid expansion of the world's population coupled with the accelerated technological development of large sectors of the world has produced a dramatic increase in the demand for energy in all forms including fuels and electricity for heating, lighting, transportation, and manufacturing processes. The construction of hydroelectric facilities and the development of fossil fuel resources has continued at a rapid rate, but it becomes increasingly evident for a number of reasons that these efforts are inadequate to keep pace with the demands of the growing population.

In the face of these growing demands and limited resources, there is one source of energy which is readily available to every country in the world in virtually unlimited quantities. This virtually untapped source is solar energy.

The interest in this almost boundless resource and in its development and harnessing for use in homes and factories is rising as other resources dwindle. Its desirability is further enhanced by the fact that solar energy may be converted to practical use without the hazard of environmental contamination.

PRIOR ART

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is made of metal and glass with one or more layers of glass laid over a blackened metal plate. Air spaces are provided between the layers of glass and air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

A second disadvantage is that the flat plate collector does nor permit the concentration of solar energy at a localized point as needed for the most effective heating of the water and the conversion of water to steam such as required in certain solar-to-electrical conversion processes.

Parabolic reflectors have been utilized in the past along with sun-tracking mechanisms is connection with various schemes for the collection, conversion and utilization of solar energy. Such equipment is described in U.S. Pat. No. 4,000,734.

At best, the prior art heat exchangers have been extremely efficient even to the point where it is necessary to incorporate thereinto an elaborate system of gears and racks or other means to shift or otherwise change the positions of the exchange or collector unit so that its relative position to the source of heat will remain constant.

While such prior art inventions do suggest workable approaches for the realization of the important objectives involved, the particular implementations described in the prior art has general fallen short of what is required in a low-cost and practical system.

SUMMARY OF THE INVENTION

In accordance with the invention claimed, an improved solar energy collector and converter is provided which is compact and inexpensive by virtue of its uniquely designed reflectors and its sun-tracking mechanism.

It is, therefore, one object of this invention to provide an improved solar energy collector carousel.

Another object of this invention is to provide a compact and inexpensive solar energy collecting rack mounted on a movable supporting platform for achieving maximum energy collection throughout the day by virtue of its effective yet inexpensive solar tracking mechanism and converter moving mechanisms.

A further object of this invention is to provide an improved rack mounted solar energy collector mounted on a rotating platform for vertically and rotationally adjusting the direction of the reflectors as appropriate to track the position of the sun throughout the daylight hours.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a solar energy rack mounted collector positioned on an arcuate movable carousel employing means for tracking the position of the sun;

FIG. 2 is a close-up view of a portion of the carousel moving means of FIG. 1 identified as area 2;

FIG. 3 is an enlarged partial view of FIG. 1 showing one of the rack elevating means;

FIG. 4 is a cross-sectional view of FIG. 1 taken along line 4—4;

FIG. 5 is a close-up view of the portion of FIG. 1 identified as area 5;

FIG. 6 is a close-up view of FIG. 1 identified as area 6;

FIG. 7 is a cross-sectional view of FIG. 1 taken along line 7—7;

FIG. 8 is a cross-sectional view of FIG. 6 taken along the line 8—8 showing an arrangement of photovoltaic cells;

FIG. 9 is a diagrammatic view of a modification of the structure shown in FIG. 1 and showing the carousel rotating means; and FIG. 10 is a close-up view of FIG. 9 identified as area 10.

DESCRIPTION OF THE PREFERRED EMBODIMENT

Referring more particularly to the drawing by characters of reference, FIGS. 1-6 disclose a solar energy collection and conversion apparatus 20 utilizing an array 21 of pivoting reflectors rotatably supported on a rack 22, the total structure being supported on and movable with a carousel type structure 23.

The array 21, a portion of which is shown in FIGS. 1, 5 and 6, comprises a multiplicity of trough shaped reflectors 24 each pivotally mounted at both ends to rack 22. An arm 25 extending perpendicularly from each end of each reflector 24 provides a support for a solar energy collector pipe 26 which runs parallel with the length of each reflector 24 coincident with its focal point so that the reflected rays of the sun are concentrated on pipe 26.

The pivotal mounting of reflectors 24 on the rack 22, as shown in FIGS. 1, 5 and 6, is accomplished by means of pivot pins 27 which pass through the top horizontal members 28 of the rack and through the ends of the reflector frames 29 at the base of the support arms 25 as shown. Parallel rows of reflectors 24 are coupled together by the parallel collector pipes 26 and by transverse coupler bars 31 which are placed at intervals along the lengths of the rows of reflectors. The coupler bars 31 are pivotally attached to each of the collector pipes 26 by means of U-shaped brackets 32. By virtue of the coupling thus afforded by pipes 26 and bars 31, reflectors 23 are caused to rotate in unison as the coupler bars 31 are moved horizontally.

The drive mechanism for the provision of such horizontal motion of the coupler bars includes a rocker arm 33 and a jackscrew 34 actuated by a suitable motor means (not shown). Reference is made in copending application Ser. No. 784,581, now U.S. Pat. No. 4,109,638 for more details of this type of structure.

The rocker arm 33 comprises two identical arms, each fashioned from flat metal stock in the general shape of a boomerang. The two arms are placed on opposite sides of the rack 22 and are each pivotally attached to bars 31 by means of a pivot pin 34. The lower portions or arms 33 have longitudinal slots 36 traversing most of their lengths and function in a well known manner obvious from the drawing.

Jackscrew 34 is aligned parallel with coupler bar 31 and it passes horizontally through free rotation bearings 37 installed in the centers of vertical support members 38 of rack 22. Jackscrew 34 also passes between the lower slotted portions of arms 33 to which it is coupled by means of pins 39 which extend through slots 36 and are welded to a nut 40 which is positioned between the arms 33 and is threadedly engaged with jackscrew 34 so that as jackscrew 34 is rotated, nut 46 moves by virtue of the engagement of slots 33 by pins 39. A pivoting motion of arm 33 is thus effected which in turn effects the pivotal motion of reflector 24 about its pivot pin 27.

Jackscrew 34 may have at one end a wheel gear (not shown) which engages a screw (shown in application Ser. No. 784,581) in the manner of a worm gear so that the rotational drive of the screw by a motor produces a corresponding rotation of jackscrew 34.

The boomerang configuration of arm 33 has utility in affording a slight tilt to the direction of the reflectors in the center of its pivotal range at which point a vertical orientation of the lower part of arm 33 is most desirable. The vertical orientation, of course, permits equal travel of jackscrew 34 in both directions, and the tilt of the upper arm corresponds to the average elevation of the sun.

The rotational tracking capability of system 20 is provided by mounting array 21 on a rotating platform such as the carousel type structure 23 which rides on a concrete ring 41, shown in FIGS. 1, 2 and 4.

The carousel type structure comprises a platform 42 as shown in FIGS. 1, 4 and 9 employing a flat circular member 42 supported by radial members 43 arranged like spokes of a wheel extending outwardly from a hub. The platform 42 may be fabricated from any suitable material.

A number of roller or wheels assemblies 45 are attached to the underside of platform 42 and positioned for alignment with the concrete ring 41 shown in FIGS. 1 and 4. Each wheel assemble 45, as shown more clearly in FIG. 4, comprises, for example, a rubber tire roller 46 with an axle 47 supported by an inverted U-shaped bracket 48. The bracket 48 is welded or bolted to platform 42. Each wheel assembly 45 is oriented such that its axle 47 is aligned with the adjacent radical member 43 of platform 42 so that as platform 42 is rotated about its center hub 44 the platform follows smoothly along the flat topped concrete ring 41.

The mechanical drive system for the rotation of platform 42 on ring 41, as shown in FIG. 2, comprises a lowspeed motor 49 with a drive sprocket 50 directly mounted to the motor shaft, a bracket 51 which carries two idler sprockets 52 and 53 and a roller chain 54.

Chain 54, as shown in FIG. 2, is of the type commonly employed in chain-and-sprocket combinations, an example of which is the ordinary bicycle chain.

Bracket 51 has an L-shaped cross-section, the upper part being utilized to mount motor 49 to platform 42 and the perpendicular lower portion being utilized to mount the idler sprockets 52 and 53.

As shown in FIG. 2, motor 49 is mounted with its shaft directed vertically downward so that the drive sprocket 50 lies in a horizontal plane. Idler sprockets 52 and 53 have their axles secured vertically to the horizontal lower sections of bracket 51 and are positioned one on each side of the drive sprocket 50 coplanar therewith.

Chain 54 may be coupled by means of the two springs in the manner shown and described in copending application Ser. No. 784,581, U.S. Pat. No. 4,109,638 to ring 41, each end of the chain being attached to a first end of one of the springs and the other end of each of the springs being attached to a steel ring which is anchored to the vertical outer surface of concrete ring 41. When attached in this manner, chain 54 extends horizontally along approximately 240° of the periphery of ring 41. The vertical position of chain 54 which is just below the top surface of ring 41, and in line with the sprockets 51, 52 and 53, may be held at a number of points by means of guides 55 which are secured to the surface of ring 41.

In the complete assembly as shown in FIG. 1, rack 22 is shown as being supportable in a number of various positions laterally of the flat surface of platform 42 by threaded rods 56 each of which may be movable in unison by one or more screw motors 57. By this mechanism, the elevation of the reflectors of their array for relatively small units, i.e. six by ten foot arrays and the like, may be set according to the latitude of the country in which it is mounted. For larger units, the threaded rods may be replaced with stationary bracings.

The nearly 240 degrees of rotation thus afforded is adequate to permit array 21 to track the daily path of the sun across the horizon from sunrise to sunset, and the simultaneous control of the elevation of the reflectors as described earlier in connection with the operation of the tracking motor for rotating the reflectors permitting a complete and total tracking capability in accordance with a primary object of this invention.

The fluid flow through pipes 26 may follow the systems described in U.S. Pat. No. 4,000,734 or copending application Ser. No. 784,581, U.S. Pat. No. 4,109,638 and such systems are incorporated herein by reference thereto.

FIG. 7 illustrates a further modification of the structure shown in FIGS. 1–6 wherein rollers 58 mounted on the bottom surface of platform 42 are arranged to roll over the top of the surface of ring 41.

FIGS. 6 and 8 illustrate that a plurality of photovoltaic cells 59 may be mounted either on the surface of pipe 26 facing the reflectors 24 or on the shield 60 which extends along and surrounds at least a part of pipes 26. Shields 60 are provided for restricting heat radiation from pipes 26. The use of photovoltaic cells 59 converts solar rays directly into electrical energy in the well known manner.

FIGS. 9 and 10 illustrate a further modification of the mounting of platform 42 of the carousel type structure 23 wherein platform 42 is mounted on water 61 within a confined pool 62. In this instance the threaded rod 56 and screw motor 57 may be replaced by telescoping hydraulic or spring biased member 63.

The platform 42 is rotated by a suitable motor 64 mounted on either the platform or pool side wall but shown in FIGS. 9 and 10 as being pool mounted. This motor drives a rubber wheel or tire 65 which frictionally engages the peripheral sides 66 of platform 42 for arcuate movement thereof through suitable reduction gears 67.

One of the basic problems inherent in maximizing the efficiency of any solar collector is that of tracking the sun. This is particularly true of focusing collectors. This problem of tracking the sun is greatly reduced, however, when the collectors are mounted on a floating platform as disclosed herein. Only a small amount of force is needed whether the raft or platform is floated in a confined pool or on open water.

The orientation of the reflecting troughs shown in FIG. 1 preferably lie in a parallel series arrangement forming a planar configuration, whose plane is at right angles to the plane of the meridian and preferably, though not necessarily, parallel to the earth's axis. The longer axes of the reflecting troughs are approximately horizontal, and at right angles to the plane of the meridian. The reflecting troughs are rotatable about the axes of the portions of the fluid flow line pipe 26 of the troughs and the several troughs are connected by a link whereby all such reflecting troughs of a series may be rotated simultaneously through an angle of 60°, more or less. The screw shown or equivalent means, is adapted for this purpose. This linkage is so adjusted that the reflecting troughs are oriented similarly with respect to the sun at all times, whatever be the angle of setting by the linkage. A light senser 68 is provided to sense the position of the sun and energize the motor for moving the reflectors about a common axis if not properly oriented to timely align the reflecting troughs toward the sun.

By these means all the reflector elements may be properly oriented continually so that the axes of their parabolic cross-sectional curves shall all lie in planes including the center of the sun. Under these circumstances the rays of the sun will continually focus upon the heater tubes independently of the altitude of the sun above the horizon. In such a manner the orientation is accomplished by such simple mechanisms thus far described, requiring only slight and intermittent attention by the senser without the use of elaborate clockwork or costly mechanisms such as are ordinarily used to focus sun rays in astronomical instruments or solar engines.

Reference is made to U.S. Pat. No. 4,000,734 for more detail of this focusing means and of the particular structural details of the light sensor 68.

The disclosed unique arrangement of the azimuth and altitude tracking of the reflectors is made possible through the ease of azimuth tracking by the floating solar collector.

A light sensor 69, shown in FIG. 1 is provided for that purpose. This sensor senses the suns rays and activates motor 49 for operation in one of two directions (i.e. forward or reverse) depending on the position of the sun's rays and rotates the platform accordingly.

With the exception of the control circuits which control the tracking motor 49 and the low speed motor 64 which rotates platform 42, a complete and effective solar energy system has been described in accordance with the stated objects of the invention.

Although but a few embodiments of the invention have been illustrated and described, it will be apparent to those skilled in the art that various changes and modifications may be made therein without departing from the spirit of the invention or from the scope of the appended claims.

What is claimed is:

1. An exchange means comprising:

a rack, said rack being mounted on a substantially horizontal platform having an arcuate configuration, said platform being positioned for rotatable movement through an arcuate path, at least a pair of juxtapositioned reflectors mounted on said rack in a parallel arrangement, each of said reflectors comprises a trough having a parabolic reflecting surface, means for pivotally mounting each of said reflectors in a parallel arrangement on said rack, a fluid bearing tube extending longitudinally of each of said reflectors on said rack and approximately disposed with the axis of a portion of said tube in the focal zone of an associated reflector.

a first electric means for moving said reflectors on said rack in unison through a similar arc partially around the portion of the tube associated with each of the reflectors for maintaining said reflectors with the axis of their curvature approximately in a plane containing the sun's center, a second electric means mounted on said support for sensing the position of the sun for moving said platform to orient and maintain said rack and reflectors with their axes of curvature of their reflective surfaces approximately in a plane containing the sun's center.

said second electric means comprising an electric motor for driving said platform sequentially back and forth around an arcuate track, said second electric means sensing the position of the sun and tracking the sun in an azimuth mode, whereby the reflection of the sun's rays are concentrated by said reflectors in a line image along said portions of said tubes, and means for selectively varying the angular position of said rack to said platform.

2. The heat exchange means set forth in claim 1 wherein:

said second electric means for sensing the position of the sun comprises a drive means mounted around at least a part of the periphery of said platform, and indexing means for causing said drive means to move said platform through an arcuate path depending on the position of the sun.

3. The heat exchange means set forth in claim 2 wherein:

said drive means comprises a link chain, and said indexing means comprises an electric motor and a sprocket driven by said motor the teeth of which are intermeshed with said chain for movement thereof.

4. The improved heat exchange means set forth in claim 3 in further combination with:

means connected to said motor for reversing the direction of rotation thereof.

5. The exchange means set forth in claim 1 wherein:

said portion of said fluid bearing tube extends outside of the periphery of the associated reflector.

* * * * *